W. & W. F. Boyd,
Bridle,
No. 13,119.          Patented June 26, 1855.

UNITED STATES PATENT OFFICE.

WM. BOYD AND WM. F. BOYD, OF WATERTOWN, MASSACHUSETTS.

BRIDLE-WINKER.

Specification of Letters Patent No. 13,119, dated June 26, 1855.

*To all whom it may concern:*

Be it known that we, WILLIAM BOYD and WILLIAM F. BOYD, of Watertown, in the county of Middlesex and State of Massachusetts, have invented a new and useful Improvement in Winkers for Horse-Bridles; and we do hereby declare that the following is a full, clear, and exact description of the same, reference being had to the annexed drawings, making a part of this specification, in which—

Figure 1:
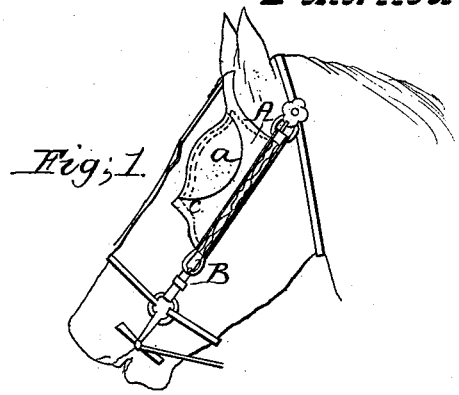
Figure 2:
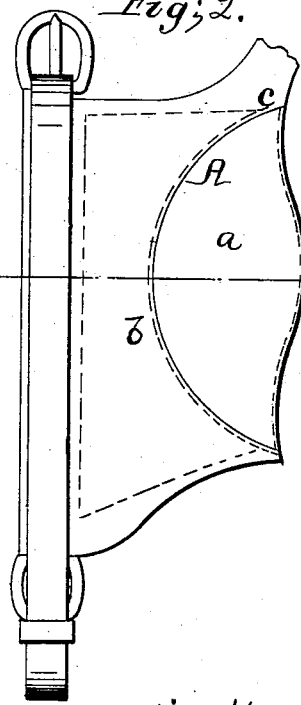
Figure 3:
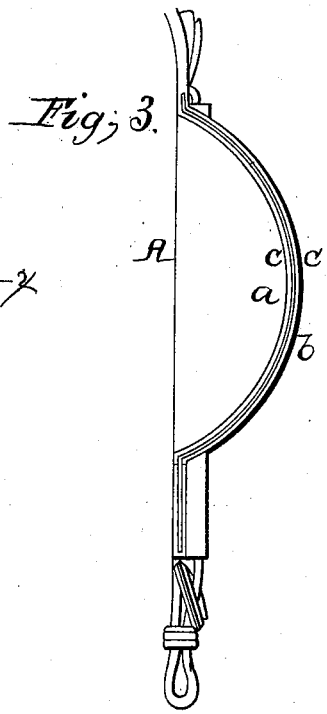
Figure 4:
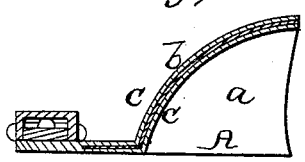

Figure 1, is a view of our improvement attached to a bridle and applied to the head of a horse. Fig. 2, is a detached side view of ditto. Fig. 3, is a front view of ditto. Fig. 4, is a transverse section of ditto, $(x)$ $(x)$ Fig. 2, showing the plane of section.

Similar letters of reference indicate corresponding parts in the several figures.

This invention relates to a new and useful improvement in winkers which are attached to horse bridles and cover the eyes of the animal.

The invention consists in forming flaring or projecting winkers on metallic plates, as will be presently shown so as to not only give the flaring projections the proper form in the first place but also to keep them in proper shape when exposed to rain and when rubbed by the horse.

A, represents the winkers which are attached to the bridle B, in the usual manner, the front portion of the winkers project outward in globular form as shown at $(a)$ leaving a recess or space between the eyes of the animal and the inner side of the projections. The inner sides of the winker around the eyes are in contact with the head of the horse, but the projection allows an open space in front for the admission of light and air.

The projections $(a)$ are kept in proper shape by having sheet metal plates $(b)$ stamped of the proper or corresponding form and inclosed between the leather sides $(c)$ $(c)$ of the winkers, see Figs. 3 and 4 and dotted lines in Fig. 2. The projections $a$ may differ from the form herein shown. The precise form may not be essential so long as the winkers are prevented from coming in contact with the eyes leaving an open space in front so that the horse can see directly in front and at the same time be prevented from seeing sidewise or backward.

By the above improvement the sight of the horse is not obstructed in a forward direction or directly ahead, and the eyes are not injured as is now the case by being in contact with unyielding pieces of leather which not only irritate them by pressure and friction but by partially excluding both light and air.

If the leather is stout the plates $(b)$ in the flaring portions of the winkers may be sufficient without using the flat plate adjoining the flaring portion as shown by dotted lines in Fig. 2. If the leather is thin however the flat plate is important as it stiffens the part of the winker between the base of the flaring portion and the cheek. The metallic plates $(b)$ keep the projections $(a)$ in proper shape. If the plates were not used the projections when moistened by rain and subjected to rubbing by the horse would lap down the upper part of the winker and destroy its shape. Our improvement prevents this.

What we claim as new and desire to secure by Letters Patent, is—

Forming the flaring or projecting portions $(a)$ of the winkers A, of horse bridles on metallic plates $(b)$ as herein shown and for the purpose as set forth.

WILLIAM BOYD.
WM. F. BOYD.

Witnesses:
CHARLES BEMIS,
ISAAC V. BEMIS.